US007518104B2

(12) United States Patent
Gabeler

(10) Patent No.: US 7,518,104 B2
(45) Date of Patent: Apr. 14, 2009

(54) METHODS AND APPARATUS FOR TIME-OF-FLIGHT MASS SPECTROMETER

(75) Inventor: Stephen C. Gabeler, Sudbury, MA (US)

(73) Assignees: Applied Biosystems, LLC, Foster City, CA (US); MDS Inc., Concord, CA (US)

( * ) Notice: Subject to any disclaimer, the term of this patent is extended or adjusted under 35 U.S.C. 154(b) by 364 days.

(21) Appl. No.: 11/548,311

(22) Filed: Oct. 11, 2006

(65) Prior Publication Data

US 2008/0091370 A1 Apr. 17, 2008

(51) Int. Cl.
*G01D 18/00* (2006.01)

(52) U.S. Cl. ........................ 250/282; 250/287; 250/288; 702/85

(58) Field of Classification Search ................. 250/281, 250/282, 287, 288; 702/85
See application file for complete search history.

(56) References Cited

U.S. PATENT DOCUMENTS 5,572,125 A * 11/1996 Dunkel ........................ 324/307
6,465,777 B1 10/2002 Rache
6,700,118 B2 * 3/2004 Yefchak et al. ............. 250/287
7,183,543 B1 * 2/2007 Overney et al. ............. 250/287
2003/0034448 A1 * 2/2003 Yefchak et al. ............. 250/282
2006/0043283 A1 * 3/2006 Davis et al. .................. 250/287
2008/0203284 A1 * 8/2008 Grothe, Jr. ............... 250/252.1

* cited by examiner

*Primary Examiner*—Jack I Berman
*Assistant Examiner*—Michael J Logie
(74) *Attorney, Agent, or Firm*—Andrew T. Karnakis

(57) ABSTRACT

Disclosed is a method of determining when to calibrate a time-of-flight mass spectrometer. In various embodiments, the method comprises storing within a controller a set of parameters for the mass spectrometer; providing an updated set of parameters while retaining at least one set of previously stored parameters; computing at least one rate of change of the updated set of parameters with respect to the at least one set of previously stored parameters; and determining when to calibrate the mass spectrometer from the results of computing the rate of change of at least one of the parameters. In various embodiments, a parameter stored can be a set of temperatures derived from obtaining system temperature measurements of those components whose changing temperature is an indication of mass drift. In various embodiments, the controller can store a history of calibration factors and temperatures over time, can calculate the time rate of change of the calibration factors and the temperature to estimate the mass drift rate of the instrument and compare the drift rate to a predetermined mass error limit for determining when re-calibration can be scheduled.

10 Claims, 2 Drawing Sheets

METHODS AND APPARATUS FOR TIME-OF-FLIGHT MASS SPECTROMETER

INTRODUCTION

The present teachings relate to methods and apparatus for mass spectrometry, and more specifically, the present teachings relate to methods and apparatus for time-of-flight mass spectrometry.

One application for mass spectrometry is directed to the study of biological samples, where sample molecules are converted into ions, in an ionization step, and then detected by a mass analyzer, in mass separation and detection steps. Various types of ionization techniques are presently known, which typically create ions in a region of nominal atmospheric pressure or within vacuum. Mass analyzers can be quadrupole analyzers where RF/DC ion guides are used for transmitting ions within a narrow slice of mass-to-charge ratio (m/z) values, magnetic sector analyzers where a large magnetic field exerts a force perpendicular to the ion motion to deflect ions according to their m/z and time-of-flight ("TOF") analyzers where measuring the flight time for each ion allows the determination of its m/z.

Time-of-flight mass spectrometers, TOF MS, are advantageous because they are instruments with virtually unlimited mass-to-charge ratio range and with potentially higher sensitivity than scanning instruments because they can record all the ions generated from each ionization step. Time-of-flight mass spectrometers measure the mass of an ion indirectly by accelerating the ion in a vacuum to a fixed energy and measuring the time of flight over a fixed distance to a detector. Variations of the energy, the distance or the measurement of time, however, may produce errors in measured mass. Some of these variations may result from components of the system with parameters that may vary with changes in temperature.

It has been proposed to control the temperature of the materials in the TOF MS that undergo expansion and that have an impact on the time-of-flight measurement, but this can be costly and ineffective due to thermal time constants of the affected materials. Another attempt has been to use the measured temperature to computationally correct the mass spectrum after it is acquired; however, this approach can be burdensome from a data processing standpoint.

Another technique for dealing with the problems of mass drift errors is to run periodic calibrations using known mass standards to create a set of calibration factors that are used to compute mass from the measured time of flight thereby minimizing these errors. Yet running calibrations too frequently when such calibration may be unnecessary results in downtime from sample analysis which has an undesirable effect for high throughput analyses.

SUMMARY

In view of the foregoing, the present teachings provide a method of determining when to calibrate a time-of-flight mass spectrometer. In various embodiments, the method comprises storing within a controller a set of parameters for the mass spectrometer; providing an updated set of parameters while retaining at least one set of previously stored parameters; computing at least one rate of change of the updated set of parameters with respect to the at least one set of previously stored parameters; and determining when to calibrate the mass spectrometer from the results of computing the rate of change of at least one of the parameters. In various embodiments, a parameter stored can be a set of temperatures derived from obtaining system temperature measurements of those components whose changing temperature is an indication of mass drift. The temperature measurement of the components can be achieved by using one or more temperature sensors mounted within the instrument and a corresponding signal conditioner to provide a temperature signal that is proportional to the temperature of the component. In various embodiments, the controller can store a history of calibration factors and temperatures over time and can calculate the time rate of change of the calibration factors and the temperature to estimate the mass drift rate of the instrument. The estimated drift rate can be compared to a predetermined mass error limit and re-calibration can be scheduled when the estimated drift approaches the predetermined error limit.

These and other features of the present teachings are set forth herein.

BRIEF DESCRIPTION OF THE DRAWINGS

The skilled person in the art will understand that the drawings, described below, are for illustration purposes only. The drawings are not intended to limit the scope of the present teachings in any way.

In the accompanying drawings.

In the drawings, like reference numerals indicate like parts.

DESCRIPTION OF VARIOUS EMBODIMENTS

Figure 1:
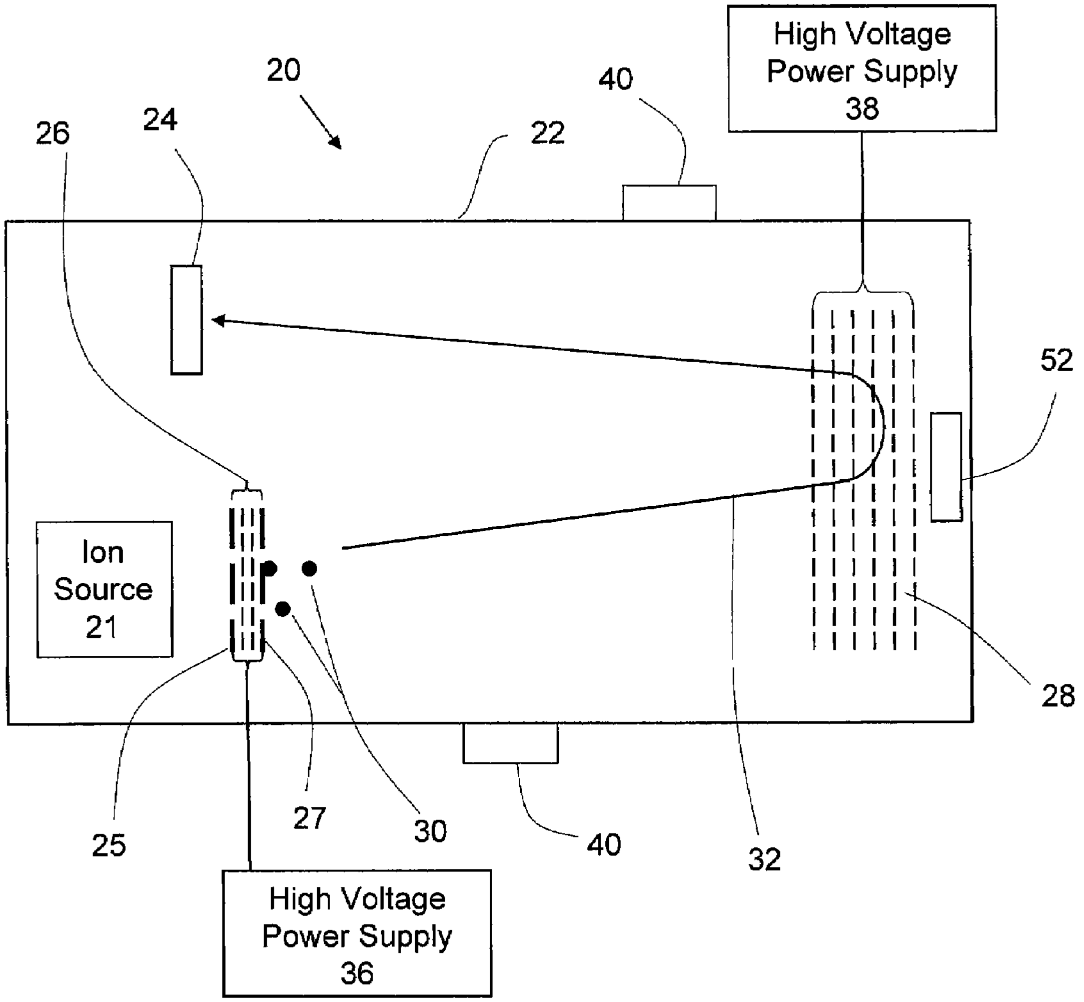
FIG. 1 is a schematic view of a time-of-flight mass spectrometer according to the present teachings.

It should be understood that the phrase "a" or "an" used in conjunction with the present teachings with reference to various elements encompasses "one or more" or "at least one" unless the context clearly indicates otherwise. Reference is first made to FIG. 1, which shows schematically a time-of-flight mass analyzer, generally indicated by reference number 20. In various embodiments, the time-of-flight mass analyzer has an ion source 21, which generally includes a sample support 25 from which ions are desorbed, one or more ion detectors 24, 52 and ion optic components comprising an electrostatic ion accelerator 26 and an electrostatic mirror 28, all located within a vacuum housing 22. The optical and mechanical components through which the ions traverse from source to detector define an ion flight path assembly. In the schematic representation of FIG. 1, the principal components of the ion flight path assembly comprise the vacuum housing 22, the sample support 25, the ion accelerator 26, the mirror 28 and the detectors 24, 52. However, as is well understood by those of skill in the art, other mechanical components, such as fasteners, hangers, mounting supports (all not shown in FIG. 1), that position and hold the principal components within the TOF MS can be part of the flight path assembly. In various embodiments, the source, detectors and optic components can be mounted within the vacuum housing 22 maintained at high vacuum conditions and the housing can share components with the ion flight path assembly through direct mounting of such components to the housing. In various embodiments, a separate flight tube through which the ions travel can be mounted at one end of the housing and the components of the ion flight path assembly may not be mounted directly to the vacuum housing. Temperature sensors 40 can be mounted on various location of the flight path assembly for providing one or more temperature measurements as will be discussed below. High voltage power supplies 36 and 38 can be connected to the accelerator 26 and mirror 28 respectively. The term "ion source" as used herein encompasses both actual ion sources where ions are generated and virtual ion sources as discussed immediately below. In various embodiments, the ion source 21 for the mass analyzer 20 can be a matrix-assisted laser desorption/ionization (MALDI) source where ions are generated from a sample deposited on the support 25 upon being irradiated by a laser. The sample support can be the first electrode of the ion accelerator. In various embodiments, the ion source 21 can be positioned external to the vacuum housing 22 and the ions transmitted from the ion source to the accelerator through the use of ion guides. In various embodiments, the ion source can also comprise a virtual ion source that provides a timing point for ion origination but does not necessarily create ions from neutrals, such as, e.g., at the exit of collision cells employing delayed ion extraction techniques, or at deflector regions employed in orthogonal time-of-flight (o TOF), instruments.

In various embodiments, in a time of flight mass spectrometer, ions can be produced in the ion source 21 and a pulse of ions 30 can be accelerated through an electric field presented by the accelerator 26 through the application of an electrostatic potential between the sample support 25 and a second electrode 27. The pulse of ions 30 fly a fixed distance, commonly referred as the flight distance, to the detector 24 and the detector produces corresponding signals at the times that the ions arrive. In various embodiments, the flight distance can be the distance defined by the path from the sample support 25 to the electrostatic mirror 28 and from the electrostatic mirror 28 to the detector 24, such as in a reflector TOF MS. In various embodiments, the flight distance can be the distance defined by the path from the sample support 25 to the detector 52 with no voltage applied to the mirror 28, such as in a linear TOF MS. It will also be apparent that the detector can be positioned at intermediate locations along the path. The detector signal can be sampled using a fixed frequency clock starting at or near the time when the pulse of ions 30 is accelerated by ion accelerator 26. Time can be measured by the count of clock ticks divided by the clock frequency. This clock tick count, interpolated to a fraction of a tick, represents the measured flight time. The measured flight time in clock ticks is proportional to the flight time in seconds assuming a fixed and stable clock frequency. Centroids of signal pulses can be computed producing time measurements to a resolution that is finer than the clock period. The energy given to the ions can be determined by the power supplies 36, 38 and the flight distance can be determined by the assembly of mechanical and optical components that comprise the ion flight path assembly, which can be an assembly of various materials having different physical properties. Each of the above mentioned parameters contribute to the final determination of the mass of each ion in the pulse of ions 30.

A basic equation relating the parameters of energy, time and distance is the equation for the kinetic energy of a moving mass. The heavier ions fly slower than the lighter ones so they arrive later. The mass of the ion is then calculated from the measured time. From basic Newtonian physics, the energy (E) of a moving object is related to its mass (m) and velocity (v) by:

$$E = \frac{1}{2}mv^2 = \frac{1}{2}m\left(\frac{l}{t}\right)^2 \tag{1}$$

In equation (1), l is the length of the flight path or simply the flight distance and t is the time. The energy of a charged ion accelerated through an electric field is equal to the voltage (V) times the number of charges (z), so:

$$E = Vz = \frac{1}{2}m\left(\frac{l}{t}\right)^2 \tag{2}$$

$$V = \frac{1}{2}\left(\frac{m}{z}\right)\left(\frac{l}{t}\right)^2 \tag{3}$$

Equation (3) represents a basic equation for TOF MS. Solving this equation for mass (actually m/z) gives:

$$\frac{m}{z} = 2V\left(\frac{t}{l}\right)^2 \tag{4}$$

As more ion optic elements are added for added functionality and performance improvements, the equation of motion for the ions can become more complex. For example, there can be a delay time or time offset to, from the measured start of the flight to the actual start due to signal propagation delays inherent in cables and in the electronic components. This delay time must be subtracted from the measured flight time to get the actual flight time. The accelerating voltage and the length of the flight path are held constant so the form of equation (4) becomes:

$$\frac{m}{z} = K_1(t - t_0)^2 \tag{5}$$

where:

$$K_1 = \frac{2V}{l} \tag{6}$$

From equation (4), we see that the measured mass is a function of voltage, of time and of flight distance. It can be useful to know how a change or a drift of any one of these three parameters will affect the mass accuracy of the TOF MS. As used herein, drift refers to a mass error that is changing over time. To show this, the first partial derivative of equation (4) can be taken with respect to each of the three parameters, while holding the others constant. For simplicity, m/z can be replaced by m:

$$m = 2V\left(\frac{t}{l}\right)^2 = K_2V = K_3t^2 = \frac{K_4}{l^2} \tag{7}$$

where:

$$K_2 = 2\left(\frac{t}{l}\right)^2 \tag{8}$$

$$K_3 = \frac{2V}{l^2} \tag{9}$$

$$K_4 = 2Vt^2 \tag{10}$$

then:

$$\frac{dm}{dV} = K_2 \tag{11}$$

$$\frac{dm}{dt} = 2K_3t \tag{12}$$

$$\frac{dm}{dl} = -2\frac{K_4}{l^3} \tag{13}$$

In practice, drift can be expressed in generic terms by 'parts per million' or ppm. This is one million times the difference in a parameter divided by the value of the parameter. For example, the ppm of mass drift, for a mass difference Δm, can be expressed as:

$$ppm = \frac{\Delta m}{m} \cdot 10^6 \tag{14}$$

So, rewriting equations (11), (12) and (13) in the form of dm/m according to equation (7) and then in to the 'parts per million' format (the same as Δm/m) gives three basic sensitivity equations, differentially coupled to the mass drift (Δm/m):

$$\frac{dm}{m} = \frac{dV}{V} \Rightarrow \frac{\Delta m}{m} = \frac{\Delta V}{V} \tag{15}$$

$$\frac{dm}{m} = 2\frac{dt}{t} \Rightarrow \frac{\Delta m}{m} = 2\frac{\Delta t}{t} \tag{16}$$

$$\frac{dm}{m} = -2\frac{dl}{l} \Rightarrow \frac{\Delta m}{m} = -2\frac{\Delta l}{l} \tag{17}$$

In practice, the differential coupling coefficients found in equations (15), (16) and (17), expressed as constants 1, 2 and −2 respectively, can vary. Techniques for time focusing of ions of the same mass but different energies such as through use of delayed ion extraction and ion mirrors can reduce the coupling coefficients expected from the above equations that describe simpler TOF MS systems. Ion optics components such as Einzel lenses used for spatial focusing and deflectors for ion beam steering have small coupling coefficients for their applied voltages because they influence the ions over a short distance and do not change the net energy of the ions. For example, the coupling coefficient for the voltage on an ion mirror electrode in a time of flight mass spectrometer system such as the 4800 MALDI TOF/TOF™ Analyzer (Applied Biosystems/MDS Sciex) may be measured empirically to be 0.732 rather than 1.000 as might be expected from equation (15) above. These coupling coefficients determined by empirical measurements can be used for mass calibration purposes as will be described subsequently.

By way of example, in the time of flight equations for simplified linear ion optics geometry a +20 ppm drift in acceleration voltage (ΔV/V) produces a +20 ppm drift in measured mass (Δm/m) according to equation (15), a +20 ppm drift in the frequency of the clock (Δt/t) measuring the flight time produces a +40 ppm drift in mass (Δm/m) according to equation (16), and a +20 ppm change in the length (Δl/l) of the flight path produces a −40 ppm change in mass (Δm/m) according to equation (17). In the example of an empirically measured coupling coefficient for an ion mirror of 0.732, a +20 ppm drift of the voltage applied would produce a +14.64 ppm drift in mass. An estimate of mass drift (Δm/m) based on measurements of other parameters can be compared to a predetermined mass error limit imposed on the TOF MS.

Despite efforts to reduce mass drift and associated mass accuracy errors using the foregoing techniques, a residual drift error that exceeds mass error limits required for certain applications can remain due to the complex nature of the components that interconnect to form the TOF MS system. In various embodiments, a mass calibration step can be performed by using one or more mass standards containing ions of known mass m/z to essentially eliminate, for subsequent analyses, the effect of mass drift. For brevity, the terms calibration mass and known mass can mean the same. A mass spectrum, obtained with the TOF MS of the mass standard can be correlated with the m/z values of the calibration mass. Subsequently, the correlation between the measured and the calibration mass can be used to compute calibration factors to arrive at a mass spectrum (peak intensity versus m/z value) from a time-of-flight spectrum (peak intensity versus time) to thus align the measured mass with the calibration mass m/z values. The calibration factors, in addition to the other parameters previously discussed, can be incorporated into the time-of-flight equations (4) and (5) so that a general form of the equations becomes:

$$m=f(a_0,a_1,a_3,a_n,t) \tag{18}$$

Where mass m can be a function of time t and of the parameters $a_0, \ldots a_n$, the parameters can be substantially constant but can be a function of temperature as described above.

Equation (18) can be expressed in the form of:

$$\sqrt{m}=a_0+a_1t+a_2t^2+\ldots a_nt^n \tag{19}$$

Where, for brevity, the generic parameter notations, $a_0, \ldots a_n$, have been used in both equations (18) and (19). These parameters $a_0, \ldots a_n$, can be general and do not necessarily imply that they are the same in each of equations (18) and (19). Note also that the calibration model, equation (19), is still a generalized form and the polynomial powers are not limited to positive integers. Fractional and negative powers can be used as well as other functions of t. In various embodiments, a calibration step can include providing a measurement of a time-of-flight spectrum from a mixture of known mass standards and from the calculation of a best fit of the parameters, $a_n$, according to equation (19). The values of the parameters, $a_n$, can be calculated by applying the mathematical method of least squares as known in the art. This method minimizes the sum of the squares of the residual errors for all of the calibration masses. Frequent calibration with standards will limit the effects of thermal drift in the mass spectrometer but takes time away from the analysis of samples.

Figure 2:
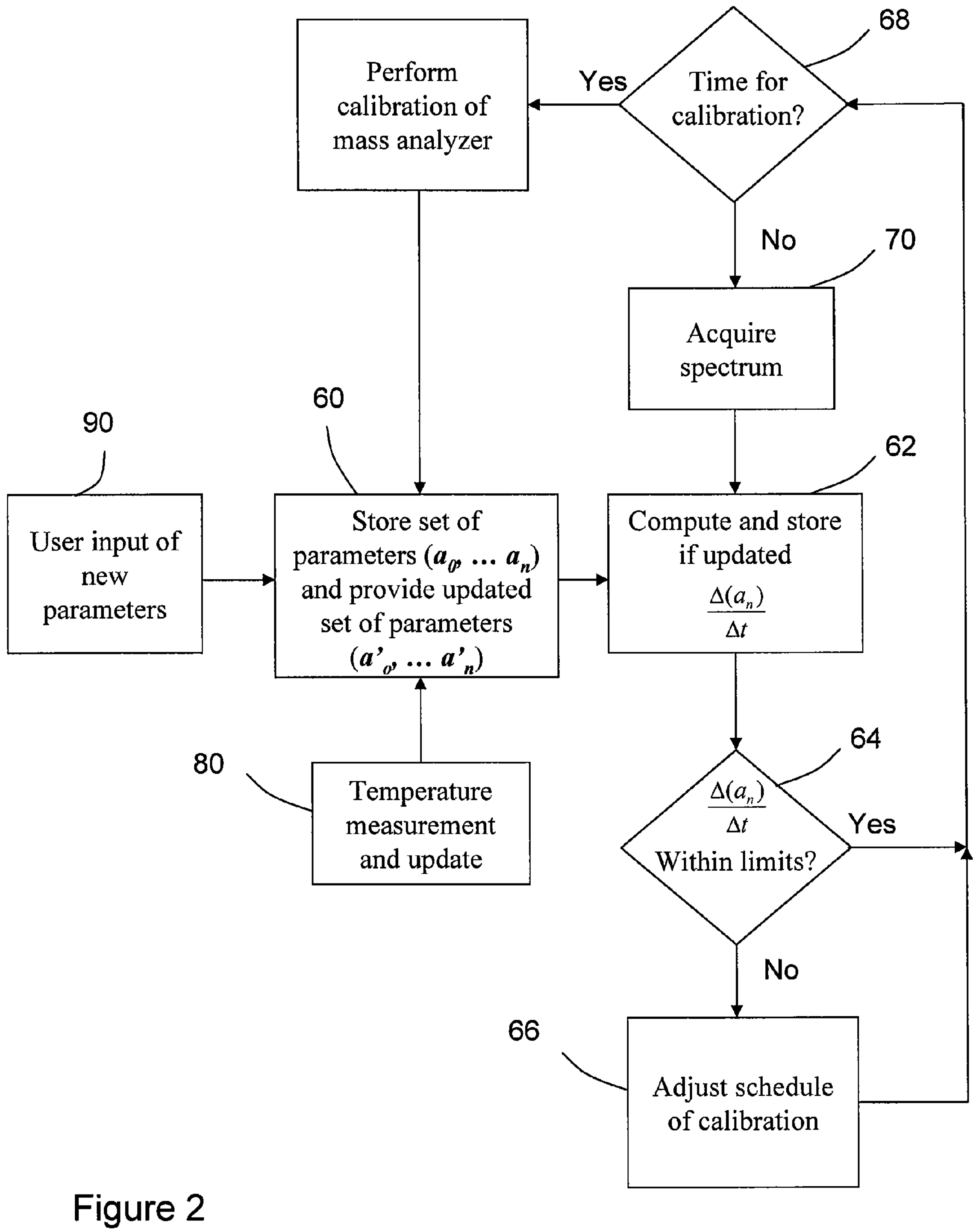
FIG. 2 is a flow diagram of the method according to various embodiments of the present teachings.

Periodic calibration using mass standards is typically established by the operator of a TOF MS in accordance with a fixed calendar schedule regardless of the state of actual instrument performance. The present teachings provide for intelligent, real time management of the calibration schedule that is responsive to conditions that can impact mass accuracy. In various embodiments, the time intervals between scheduled calibration can be based on current and previous measured temperatures in the system as well as on the recorded values of the $a_n$ measurements and their computed rates of change. These combined data are used to assess the stability of the system and the expected mass drift. Note that the measured temperatures are used only as part of an assessment of instrument system stability and are not used directly for correction. Given the estimated mass drift rate and a predetermined mass error limit, a re-calibration interval is computed that will maintain the error within the desired limits. With reference to FIG. 2, a set of parameters $a_0, \ldots a_n$, previously measured or calculated as described above, can be stored as indicated by reference numeral 60 in a controller, such as a system controller as described with respect to FIG. 1, for immediate or future retrieval. At a predetermined later time period, an updated set of parameters $a_0', \ldots a_n'$, can be provided by further measurements or by further calculations. The updated set of parameters can be stored in the controller along with the set of previously stored parameters. The difference between the updated set of parameters and the previously stored set of parameters, over the predetermined time period, Δt can be used to compute the rates of change of the updated set of parameters with respect to the set of previously stored parameters, $$\frac{\Delta(a_n)}{\Delta t}$$

as indicated by reference numeral 62. Any convenient method of computing the rates of change can be used, such as an electronic circuit or a set of mathematical instructions within the system controller.

Based on the rates of change of the updated parameters, the mass drift rate for the given predetermined time period can be estimated from equations (15), (16) and (17). The estimated mass drift rate can be compared as shown by logic element 64 to a predetermined mass error limit and if the estimated mass drift rate approaches or exceeds the mass error limit, the time for conducting a re-calibration can be adjusted as indicated at 66. If the estimated mass drift rate is less than the mass error limit, but greater than the pre-established, fixed time for conducting another calibration, re-calibration can be scheduled as indicated by logic element 68. If neither of the conditions in the preceding two sentences is satisfied, the analysis continues and a mass spectrum can be acquired as shown by 70. The rate of re-calibration can substantially depend on the level of the predetermined mass error limit imposed on the model. For example, if the mass error limit is predetermined to be 10 ppm and the predicted error at the next scheduled calibration would be 20 ppm, then the time to the next calibration would be reduced such that the predicted error is less than 10 ppm.

In some circumstances, changes in measured temperature can occur before any changes in mass error occur. Temperature measurements also require insignificant time compared to calibration. Thus measured temperatures can be inputted to the stored set of parameters as indicated on FIG. 2 by reference numeral 80 and used to assess the stability of the instrument system. In various embodiments, the time period or the interval of providing updated temperature measurements can be more frequent than the time period or interval of providing updated calibration factors.

There are other aspects of the TOF MS instrument which can have an affect on drift, but in the present teachings, the model as exemplified by equations (15), (16), and (17) can be sufficient to describe the major contributors to mass drift. All three parameters, voltage, time and distance, have temperature coefficients and thermal time constants which can contribute to the drift characteristics of the instrument. For example, the power supply electronic components, which provide voltages for ion optics, and the time measurement clock, which provides the timing, can each have temperature coefficient properties affecting the corresponding voltage and time values. The power supply components and the clock, additionally, can each have a thermal time constant, which can attribute to delayed response to any temperature variations. The materials in the assembly can have thermal expansion coefficients, which can result in altering the flight distance as a response to any temperature variation.

The aspect with the delayed response due to the thermal time constant of the power supplies and clock, however, has largely been unaddressed in TOF MS applications, particularly in response to adjustments to instrument operation intentionally made by the user. Power supplies can be, for example, self-heating and can respond to changes or adjustments in the operating parameters intentionally imposed on the mass analyzer. For example, when the power supplies are adjusted by the operator to provide a different voltage delivered to the ion optic element of the mass analyzer, the power supply electronic components can establish a new thermal operating level in response to their internal heat generation or cooling. The new level will have a thermal time constant for the power supply to reach a new thermal equilibrium, and during that time period the new voltage setting can continue to vary. Mass drift will be expected to increase during this period as well. Consequently in various embodiments, any intentional adjustments made in the operating parameters of the mass analyzer can be used as an input parameter in accordance with the present teachings to reduce the time interval between calibrations as shown by 90 in FIG. 2.

The invention claimed is:

1. A method of determining when to calibrate a time-of-flight mass spectrometer comprising:

(a) storing within a controller a set of parameters for the mass spectrometer;

(b) providing an updated set of parameters while retaining at least one set of previously stored parameters;

(c) computing at least one rate of change of the updated set of parameters with respect to the at least one set of previously stored parameters; and (d) determining when to calibrate the mass spectrometer from the results derived from step (c).

2. The method of claim 1 wherein the parameters are selected from one of calibration factors, temperature and voltage or a combination thereof.

3. The method of claim 1 wherein step (d) comprises estimating a mass drift rate computed from the rate of change of the updated parameters.

4. The method of claim 2 comprising scheduling the time of the next calibration of the mass spectrometer to maintain a predetermined mass error limit.

5. The method of claim 2 comprising storing calibration factors and at least one temperature measurement that affects mass accuracy.

6. The method of claim 5 wherein the interval of providing updated temperature measurement is more frequent than the interval of providing updated calibration factors.

7. The method of claim 6 wherein the updated temperature measurement initiates computing the rate of change of the temperature and step (d).

8. The method of claim 1 wherein the updated parameters are provided by recalibrating the mass spectrometer using mass standards.

9. The method of claim 1 wherein the updated parameters are computed from intentional adjustments in operating parameters of the mass spectrometer.

10. The method of claim 9 wherein the adjustments are changes to the voltage applied to an ion optic element of the mass spectrometer.

* * * * *